United States Patent [19]
Ross et al.

[11] Patent Number: 5,856,888
[45] Date of Patent: Jan. 5, 1999

[54] SPLIT BEAM OPTICAL CHARACTER READER

[75] Inventors: William Ross, Merrickville; Gary van Beek, North Gower, both of Canada

[73] Assignee: AIT Corporation, Ottawa, Canada

[21] Appl. No.: 647,599

[22] Filed: May 13, 1996

[51] Int. Cl.$^6$ .............................. G02B 5/10; G02B 5/08; G02B 7/182; G02B 27/10
[52] U.S. Cl. .................... 359/857; 359/858; 359/862; 359/618; 359/472; 348/43; 348/49; 348/51
[58] Field of Search .................... 359/857, 858, 359/862, 618, 472, 471; 348/43, 49, 51, 54; 382/321

[56] References Cited

U.S. PATENT DOCUMENTS

| | | | |
|---|---|---|---|
| 4,146,786 | 3/1979 | Agulnek | 250/235 |
| 4,634,882 | 1/1987 | Craine et al. | 250/578 |
| 4,740,836 | 4/1988 | Craig | 348/49 |
| 4,956,547 | 9/1990 | Mita | 250/208 |
| 5,223,703 | 6/1993 | Setani | 250/208.1 |
| 5,357,369 | 10/1994 | Pilling et al. | 359/471 |
| 5,636,069 | 6/1997 | Nightingale et al. | 359/618 |

FOREIGN PATENT DOCUMENTS

| | | |
|---|---|---|
| 2074127 | of 1993 | Canada. |
| 2107823 | 4/1995 | Canada. |
| 0 676 889 | 10/1995 | European Pat. Off.. |

*Primary Examiner*—Cassandra C. Spyrou
*Assistant Examiner*—Mohammad Y. Sikder
*Attorney, Agent, or Firm*—Robert A. Wilkes

[57] ABSTRACT

An optical system for an optical character reader in which a camera, such as a TV camera, reads an image field in a document, includes at least one pair of mirrors which shift half of the image both laterally and vertically to convert a relatively long image, for example with a length to height aspect ratio of 1.5:8, into a rectangular image with a much lower aspect ratio, for example 3:4. Preferably two pairs of mirrors are used, so that the image light path for both parts of the image field is the same length. This optical system reshapes the image field from one having an aspect ratio which does not match the 3:4 aspect ratio of most cameras, such as camcorders, TV cameras, security and surveillance cameras and the like, into one that does, thus significantly simplifying the optical character reader, and lowering its cost.

8 Claims, 5 Drawing Sheets

SPLIT BEAM OPTICAL CHARACTER READER

BACKGROUND OF THE INVENTION

This invention relates to optical character reading equipment used in the machine reading of documents such as passports, security passes, and the like. These documents usually contain graphic material, alphanumeric symbols and text, some of which is often coded. Much of this data is visible to, and readable by, both the user and an optical character reader; it is also known to include data in a document which is only readable by a suitable optical character reader. It is also known that part or all of the machine readable text need not be visible under ordinary light, requiring a special light source to render it readable.

The majority of the currently available optical character reading equipment uses as the image sensitive device a charge coupled device, or CCD, array; in older equipment other imaging devices, such as orthicon tubes, are used. The document to be read is illuminated with a suitable light source, and a sharp, focussed image is provided at the light sensitive device by a suitable lens system. This image is then converted into an electronic image of part of the document by suitable accompanying electronic devices. For convenience, in this application, this combination of a focussing lens system and a light sensitive device is termed an "imaging device".

This invention is concerned with providing an improved optical character reader which both simplifies existing readers, and also permits the use of relatively low cost standard CCD arrays in the imaging device. This invention provides an optical system whereby, for example, the optical image of a line, or two or three lines, of text is split into two contiguous equal length sections, and at least one of them is then displaced both laterally and vertically to a position above (or below) the other. By careful selection of the length of the two sections, it is then possible to read both of them at once with a standard CCD array.

DESCRIPTION OF THE PRIOR ART

An optical character reader including a beam splitter has been proposed in the past. In these devices either mirrors, which may be full or half silvered, are used to split a beam into at least two parts, and each part is then read by a separate imaging device; examples of this approach are Craine et al, U.S. Pat. No. 4,634,882 and Diehl et al, CA 2,074,127. In each of these devices, different parts of the machine readable indicia are read by separate imaging devices: in one application Craine et al. show a single image split into four parts, each of which is read separately; Diehl et al split a single image into three parts each of which is read separately. In both Craine et al and Diehl suitable electronics are used to produce either one or several images from the imaging device signals.

It has also been proposed to split up an image chromatically, to provide several images, each image representing only some of the colours in the original. Devices of this type are described by Olaru, CA 2,107,823, in which coloured filters are used, and by Setani, U.S. Pat. No. 5,223,703, in which a diffraction grating is used for colour separation.

A different device is described by Mita, U.S. Pat. No. 4,956,547, in which what may be called a beam combiner, rather than a beam splitter, is used. In the Mita reader, by using separate light sources and a system of mirrors images derived from both sides of a single document are presented to the imaging device. However, both sides of the document are not read simultaneously: by either interrupting the image beam, or switching the two sets of illuminating lights on and off, images from each side of the document are read seriatim.

All of these known devices seem to suffer from either or both of two disadvantages. First, only small parts of the document are read at any one time, and second specially shaped imaging devices are needed. The consequence of this is that either the imaging device is expensive, or it is not being used efficiently, in the sense that the image being read covers only a part of the imaging device. In other words, the aspect ratio of the light sensitive array in the imaging device, which is the ratio between the length and height of the array, does not match, or even come close to, the aspect ratio of the information in the document that is being read.

SUMMARY OF THE INVENTION

This invention seeks to overcome these difficulties, and to provide an optical system whereby the commonest CCD array equipment—which is also by a significant margin the cheapest—can be used in an optimal manner to read as much as possible of the machine readable field in the document in a single pass.

In a typical machine readable document the field of optical character recognition typically has an aspect ratio of from about 1:3 to 1:5; that is to say that the width of the image character field is from three to five times greater than the height of that field. As an example, in machine readable passports the machine readable zone is typically 23.5 mm high and 125 mm wide, giving an aspect ratio of 1:5.32.

In theory, imaging devices can be made with light sensitive arrays having any desired aspect ratio, but in practise imaging devices are made only in a square or rectangular format. Square format imaging devices are only used in certain scientific applications—such as astronomy—and, at least in part due to the small numbers made, and to the specific tasks they are designed to carry out, are expensive. Rectangular format imaging devices are made in several aspect ratios. For some machine vision applications aspect ratios in the range of from 1:1, that is, square, to 1:1.5 are used. These devices are also relatively expensive, at least in part due to the small numbers being made for limited, specific, uses.

In practise, the commonest aspect ratio used in imaging devices is that of the ordinary television screen, which is also used in numerous other devices, including computer terminals and the like. All TV cameras, including camcorders and the like, surveillance cameras, and security scanners, use a more or less standard rectangular format image, with an aspect ratio of about 3:4, or 1:1.33. Because of the ever increasing use of these devices in a multitude of applications, considerable effort has been put into making good quality light sensitive arrays in high volume, and consequently at a low price. As a consequence, a good quality light sensitive array having an aspect ratio conforming to TV practise costs only tens of dollars, as against thousands for some of the other types. There is also available a wide range of supporting electronic devices for imaging devices with this aspect ratio, including the increasingly used digital systems, of which the ordinary TV camera is but one example.

This invention seeks to provide an optical system whereby an image having an aspect ratio which does not conform to this industry standard of 3:4 is converted into one that does, and which also makes efficient use of most of the available area of the light sensitive array in the imaging device. This is achieved by an optical system in which a viewed image is split into two equal parts, at least one of the parts is moved both vertically and laterally relative to the other to a position adjacent the other, and the combined image is then read by the imaging device. By this procedure, an image having dimensions giving an aspect ratio of about 1.5:8 is first split into two images each with an aspect ratio of about 1.5:4, and then combined into a single image with an aspect ratio of about 3:4, that is, having an aspect ratio which matches the standard TV camera ratio. In other words, a single line image which is approximately half the height and twice the width of the light sensitive array in the imaging device is converted into a two line image which is about the same height and width as the light sensitive array.

Thus this invention seeks to provide an optical system for a document reader which converts an image having an aspect ratio of about A:2B into an image having an aspect of about 2A:B, in which ratios 2A<B.

In a first broad embodiment, this invention seeks to provide an optical system for a document reader in which a data image having an aspect ratio of height to length of about A:2B is converted by an imaging device having an optical axis into an electronic signal, which imaging device has an image field aspect ratio of height to length of about 2A:B, in which ratios 2A<B, wherein the optical system includes in the reflected light path between the document and the imaging device, at least one mirror pair in which at least one mirror is tilted, and in which a first mirror reflects a first half portion of the data image laterally to a second mirror located nearer to the lens than the first mirror, and which second mirror reflects the image of the first half portion of the data image to the imaging device in a direction parallel with the optical axis of the imaging device, to provide two images at the imaging device image field which together have an aspect ratio of about 2A:B.

Preferably, the ratio 2A:B is about 3:4.

Preferably, each image contains half of the data. More preferably, each image includes more than half of the data, so that at least a part of one end of one image is included in the other end of the other image.

Preferably, the optical system includes two mirror pairs in the light path between the document and the imaging device, the first of which reflects the image of the first half portion of the data image, and the second of which reflects the image of the second half portion of the data image, to provide two images at the imaging device.

Preferably, in the, or each, mirror pair the second mirror is tilted. Alternatively, in the, or each, mirror pair both the first and the second mirrors are tilted.

BRIEF DESCRIPTION OF THE DRAWINGS

The invention will now be described with reference to the attached Figures in which.

In each of FIGS. 2, 3, 4 and 5 the line indicated as I—I refers to the optical axis of the imaging device. The electronic devices used to convert the optical image signal provided by the imaging device into a visible image are not shown.

Figure 1:
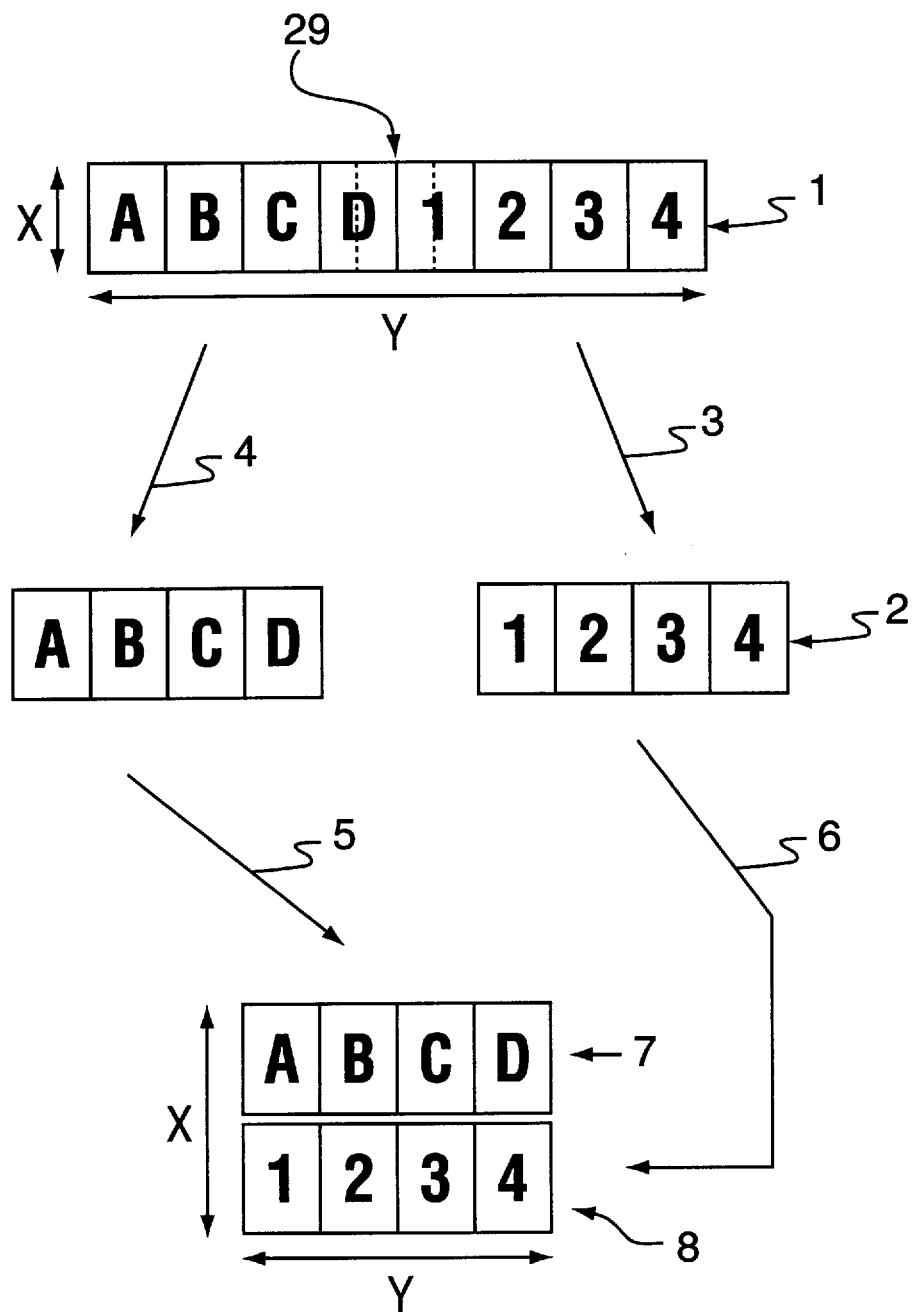
FIG. 1 shows schematically image rearrangement.

Referring first to FIG. 1, a typical short length of machine readable alphanumeric text is shown at 1, having a height X and a width Y. As shown, the aspect ratio X:Y for this short length of text is 1.5:8. With conventional equipment using an aspect ratio of 3:4, there are essentially two ways this text could be read: by diminishing its size, so that the full eight characters can be read simultaneously, or by reading it as two sets of four characters. If it is read by diminishing its size, then the characters will need to be reduced by 50%, to have an effective aspect ratio of 0.75:4, which implies that only one quarter of the available area of the image field of the imaging device is being used. If it is simply split into two equal parts, then each of these will have an aspect ratio of 1.5:4, which in addition to requiring two steps to read the text, also implies that only half of the image field of the imaging device is being used.

Neither of these approaches are used in this invention. Instead, as shown at 2, the reflected image beam is split into two parts using at least one mirror, as at 3, 4. The image is then reorganised by at least one further mirror, as at 5,6 to place one half of the original image over the other half, as at 7 and 8. The resulting combined image then has an aspect ratio X:Y of 3:4, thus matching nicely a standard configuration imaging device.

As shown in FIG. 1, the left half of the image is placed below the right half: it is equally possible to angle the mirrors to place the left half above the right half.

Figure 2:
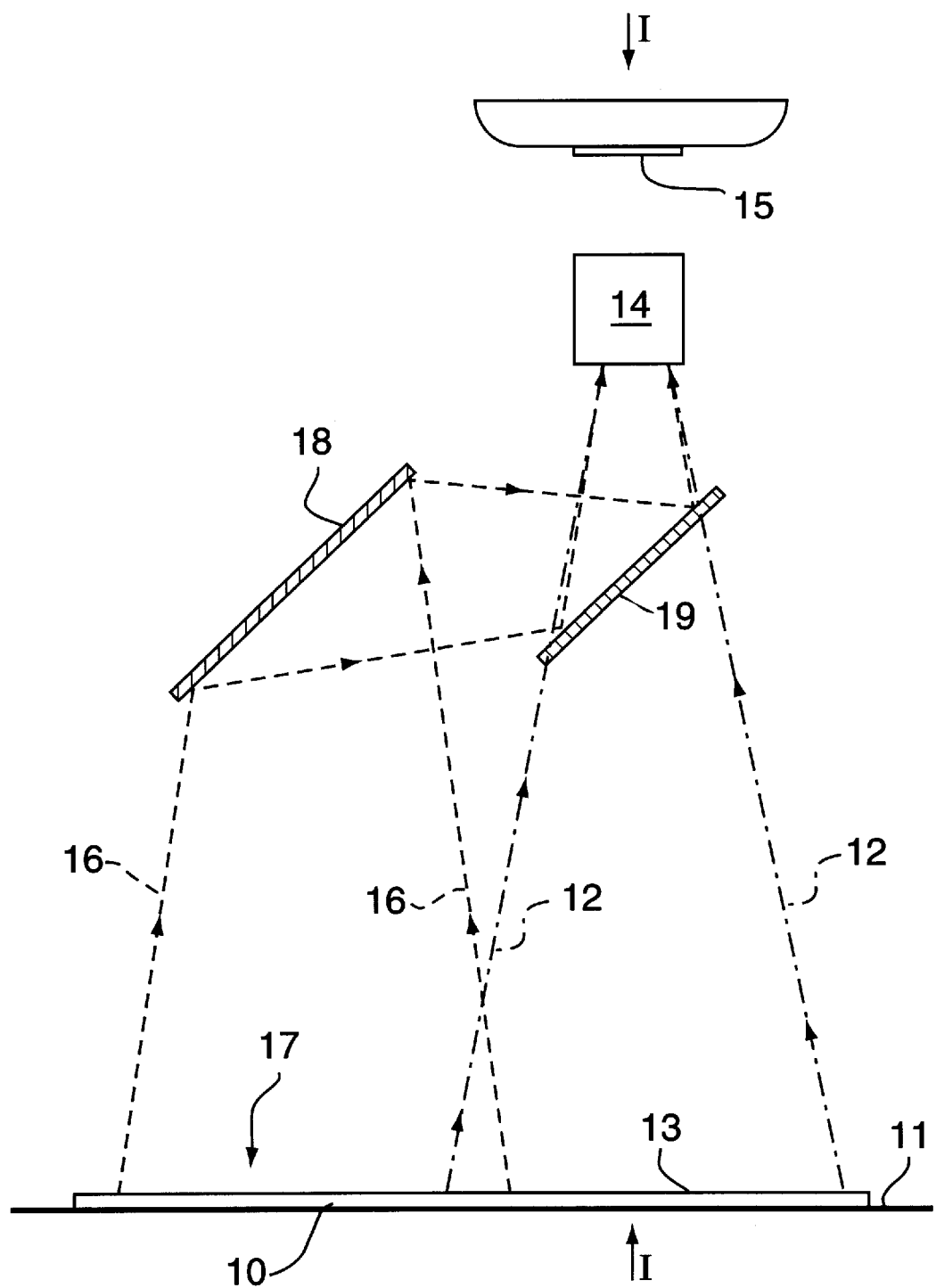
FIG. 2 shows schematically in a plan view an optical focussing system using one pair of mirrors.
Figure 3:
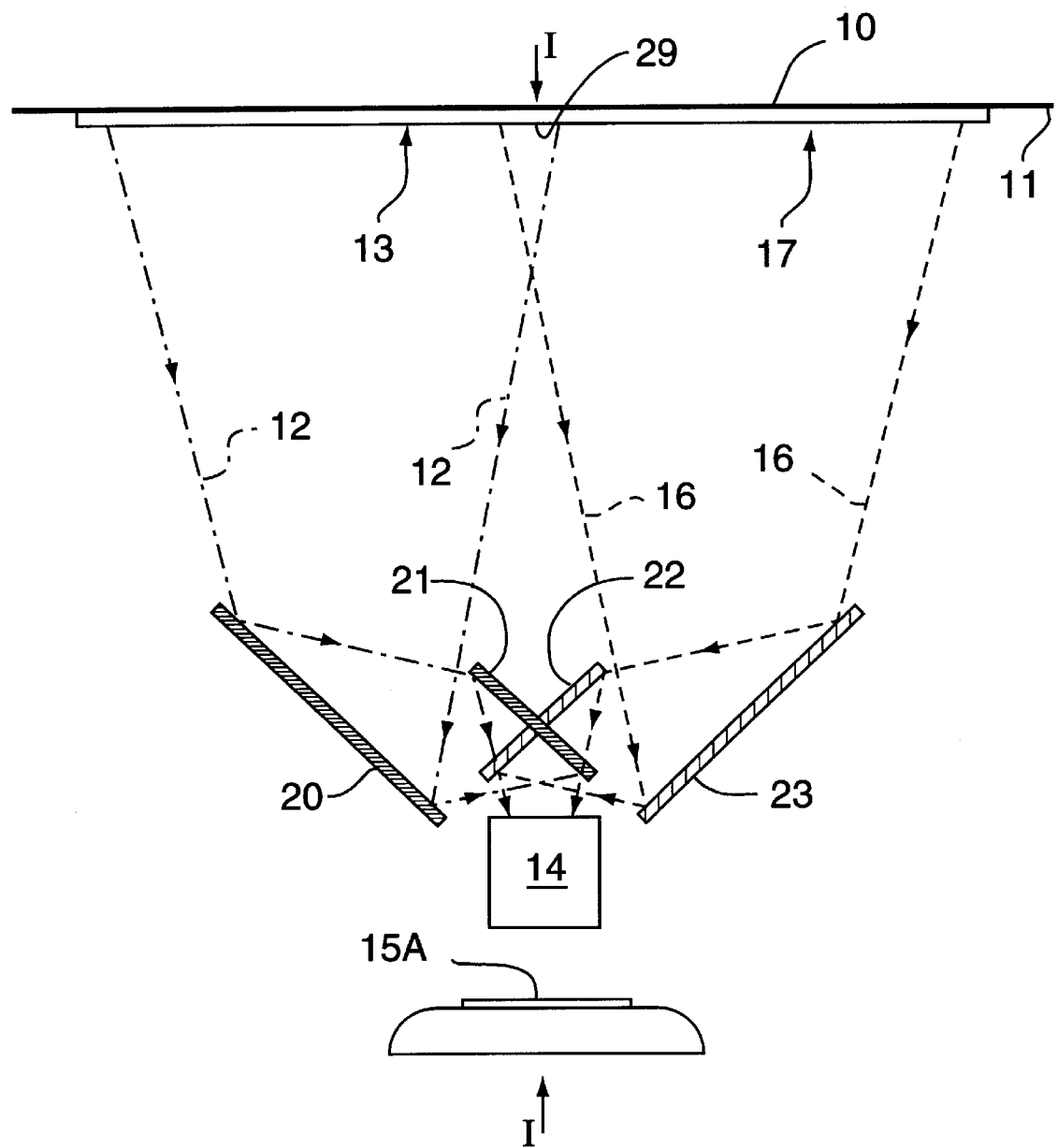
FIG. 3 shows schematically in a plan view an optical focussing system using two pairs of mirrors.

Two possible mirror arrangements are shown schematically in plan in FIGS. 2 and 3. In FIG. 2, the machine readable data is carried by the document 10, on a support surface 11. Reflected light 12 (the light source is omitted for clarity) from one half of the data to be read, 13, is focussed by the imaging device lens 14 to provide a first image 15. In other words, one half of the data within the image field of the document 13 is read directly. Reflected light 16 from the other half, 17, of the data is reflected sideways by mirror 18, and then towards the lens 14, by the mirror 19. Either, or both, of mirrors 18 and 19 are tilted, so that the second image of data 17 is not superimposed on the first image of data 13, but rather is either above, or below, it as shown in FIG. 1. It therefore follows that the mirror 19 is out of the path of the beam 12.

This arrangement has the disadvantage that the optical paths from the two parts of the data 13 and 17 through the lens to a pair of focussed images is not the same length. It is therefore difficult to focus both parts of the original image to the same level of sharpness and clarity. For some applications such a lower level of image sharpness can be acceptable.

Figure 4:
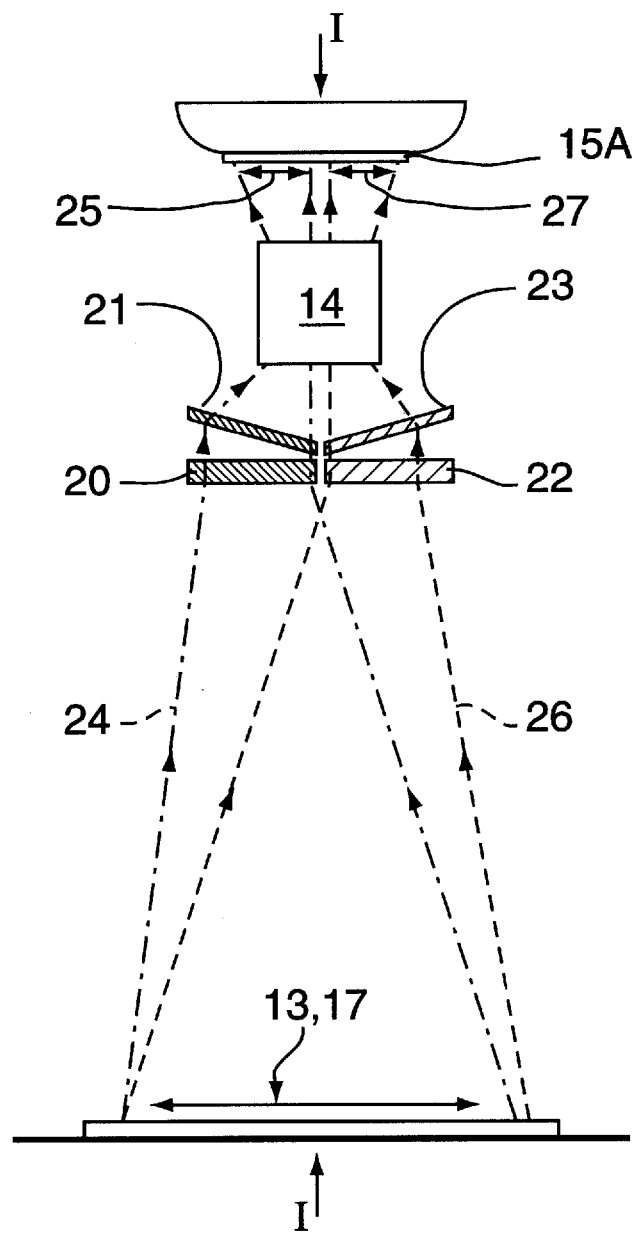
FIG. 4 shows a schematic side elevation of the optical system of FIG. 3.
Figure 5:
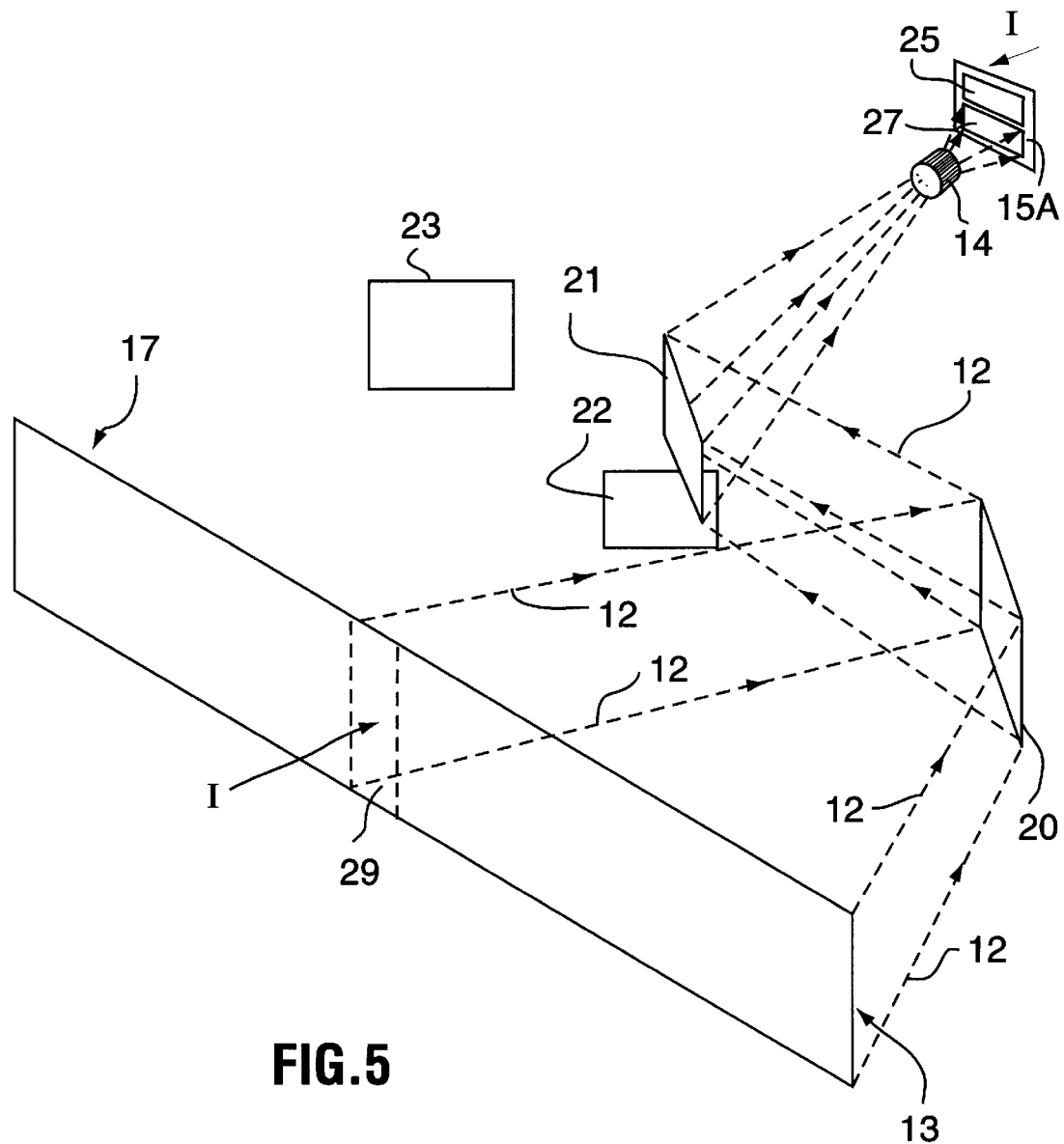
FIG. 5 shows an isometric view of the optical system of FIGS. 3 and 4.

In FIGS. 3, 4 and 5 the light reflected from both parts 13 and 17 of the data on the document 10 is shifted both laterally and vertically; for clarity, only one of the light paths is indicated in FIG. 5. Reflected light from the first part, 13, of the data is moved both sideways and vertically by the two mirrors 20 and 21, and then focussed into a first image 27. Similarly, reflected light from the second half, 17, of the data is moved both sideways and vertically by the two mirrors 22 and 23, and then focussed to provide a second image 25 laterally displaced from the first. Both of these images are focussed to a common image plane 15A. Each of mirror pairs 20, 21 and 22, 23 is out of the image light path of the other, as can be seen more clearly in FIG. 4, and in the isometric of FIG. 5. Reflected light 24 from data half 13 provides a first focussed image 25, and reflected light 26 from data half 17 provides a second focussed image 27 below the first image. As noted above, these positions can be reversed.

This arrangement has the advantage that the optical path length is the same from both halves of the image, and therefore adequate clarity and sharpness of the complete image can be obtained.

In each of these systems pairs of mirrors are used to move an image essentially vertically and laterally. Pairs of flat mirrors are generally satisfactory for this purpose. In order to obtain the combined lateral and vertical shift in each image light path, at least one mirror in the mirror pair must be tilted. Whilst it is possible to tilt both mirrors, it appears that it is only necessary to tilt one of them, the other being located in a plane having one axis substantially perpendicular to the optical axis of the system. It appears that best results are obtained when the tilted mirror is the one closest to the lens system, as is shown in FIG. 4.

It is preferred that each of the mirrors is front silvered, thus avoiding the twin problems of light loss and ghost images encountered with conventional back silvered mirrors. If some loss in image quality is acceptable, back silvered mirrors can be used. Further, it is possible to use polished metal mirrors, but these are both difficult to make, and frequently impair image clarity. It is also possible to use pairs of internally reflecting prisms, but again these are relatively expensive.

In FIG. 3 a small central portion 29 of the data image (see also FIG. 1) is included at opposite ends in both of the two halves 13 and 17 of the image, whilst in FIG. 1 as described above this does not occur, and two separate images 7 and 8 of the two parts of the data image are obtained. That is, there is no area of overlap between the two images. Although in theory it is possible to use this optical system without any image overlap, and the mirrors can be set so that it does not happen, it is found that in practise this is extremely difficult to achieve, as a very high level of accuracy in the mirror alignment is then necessary. This becomes almost impossible to achieve when one character or other symbol in the data image is partly in both of the optical images. For example, in FIG. 1 two complete images are possible as there are a total of eight alphanumeric characters: two complete images would not be possible with nine characters in the same space. Whilst it is desirable to align the mirror pairs reasonably accurately, the accuracy required is diminished when some image overlap is used, preferably so that there is up to one character width overlap between the two images. In viewing the data, this overlap area is easily electronically eliminated.

We claim:

1. An optical system for a document reader in which a data image having an aspect ratio of height to length of A:2B is viewed by reflected light contained in a reflected light path, and is converted by an imaging device having an optical axis into an electronic signal, which imaging device has an image field aspect ratio of height to length of about 2A:B, in which ratios 2A<B, wherein:

(i) the optical system includes two mirror pairs in the reflected light path between the document and the imaging device, in each of which pairs at least one mirror is tilted;

(ii) each pair of mirrors includes:
      (a) a first mirror which reflects a half portion of the data image laterally to a second mirror located nearer to the imaging device optical axis than the first mirror, and
      (b) the second mirror reflects the image of the half portion of the data image to the imaging device in a direction parallel to the optical axis of the imaging device;

(iii) a first mirror pair reflects the image of a first half portion of the data image to a focussing device; and (iv) a second mirror pair reflects the image of a second half portion of the data image to the focussing device; to provide two focussed images at the imaging device image field which together have an aspect ratio of about 2A:B.

2. An optical system according to claim 1 wherein each image at the imaging device image field includes half of the data image.

3. An optical system according to claim 1 wherein each image at the imaging device image field includes more than half of the data image, so that at least a part of one end of one image is included in the other end of the other image.

4. An optical system according to claim 1 wherein the ratio 2A:B is about 3:4.

5. An optical system according to claim 1 wherein in each mirror pair the second mirror is tilted, the first mirror being located in a plane having one axis substantially perpendicular to the optical axis of the system.

6. An optical system according to claim 1 wherein in each mirror pair both the first and the second mirrors are tilted.

7. An optical system according to claim 1 wherein each of the mirrors is chosen from the group consisting of front silvered mirrors, back silvered mirrors, and internally reflecting prisms.

8. An optical system according to claim 7 wherein each of the mirrors is a front silvered mirror.

* * * * *